(12) United States Patent
Shirakawa et al.

(10) Patent No.: US 11,414,573 B2
(45) Date of Patent: *Aug. 16, 2022

(54) ADHESIVE COMPOSITION

(71) Applicant: HITACHI CHEMICAL COMPANY, LTD., Tokyo (JP)

(72) Inventors: Tetsuyuki Shirakawa, Tokyo (JP); Satoru Matsumoto, Tokyo (JP); Yusuke Asakawa, Tokyo (JP); Tatsuya Kumada, Tokyo (JP); Takahiro Fukui, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 16/328,944

(22) PCT Filed: Aug. 29, 2017

(86) PCT No.: PCT/JP2017/031010
§ 371 (c)(1),
(2) Date: Feb. 27, 2019

(87) PCT Pub. No.: WO2018/043505
PCT Pub. Date: Mar. 8, 2018

(65) Prior Publication Data
US 2019/0241770 A1    Aug. 8, 2019

(30) Foreign Application Priority Data

Aug. 30, 2016  (JP) .............................. JP2016-167655
Aug. 2, 2017   (WO) ................. PCT/JP2017/004605

(51) Int. Cl.
C09J 9/02      (2006.01)
C09J 201/00    (2006.01)
(Continued)

(52) U.S. Cl.
CPC . *C09J 9/02* (2013.01); *C09J 7/00* (2013.01); *C09J 163/00* (2013.01); *C09J 175/16* (2013.01); *C09J 201/00* (2013.01)

(58) Field of Classification Search
CPC ...... H01B 5/16; H01B 1/22; C09J 9/02; C09J 7/10; C09J 4/06; C09J 7/35; C08G 59/50; C08L 21/00; C08K 3/08
(Continued)

(56) References Cited

U.S. PATENT DOCUMENTS 6,787,233 B1 *  9/2004  Molteberg ............... C08K 3/08
                                              428/403
2001/0028953 A1 * 10/2001  Bluem .................... C09J 7/35
                                              428/355 AC
(Continued)

FOREIGN PATENT DOCUMENTS

CN    103548207 A    1/2014
CN    103764776 A    4/2014
(Continued)

*Primary Examiner* — Khanh T Nguyen
(74) *Attorney, Agent, or Firm* — Fitch, Even, Tabin & Flannery, LLP

(57) ABSTRACT

One aspect of the present invention relates to an adhesive composition used for connecting electronic members, the adhesive composition comprising: a first conductive particle that is a conductive particle having a projection capable of penetrating an oxide film formed on a surface of an electrode of the electronic member; and second conductive particle that is a conductive particle other than the first conductive
(Continued)

particle, the second conductive particle having a nonconductive core body and a conductive layer provided on the core body.

20 Claims, 5 Drawing Sheets

(51) Int. Cl.
*C09J 163/00* (2006.01)
*C09J 7/00* (2018.01)
*C09J 175/16* (2006.01)

(58) Field of Classification Search
USPC .................... 252/500, 514; 428/403, 414
See application file for complete search history.

(56) References Cited

U.S. PATENT DOCUMENTS

| | | | | |
|---|---|---|---|---|
| 2008/0230749 A1* | 9/2008 | Matsuse | ............ | C08F 299/04 252/500 |
| 2009/0133900 A1 | 5/2009 | Nishikawa | | |
| 2009/0189254 A1 | 7/2009 | Kaneya | | |
| 2012/0177930 A1* | 7/2012 | Henckens | ............ | H01B 1/22 428/414 |
| 2015/0129812 A1* | 5/2015 | Scherf | ............ | C08L 21/00 252/514 |
| 2020/0321305 A1 | 10/2020 | Shirakawa et al. | | |

FOREIGN PATENT DOCUMENTS

| | | | | | |
|---|---|---|---|---|---|
| JP | H10-116640 A | | 5/1998 | | |
| JP | 2003-045229 A | | 2/2003 | | |
| JP | 2006-108523 A | | 4/2006 | | |
| JP | 2012-028334 A | | 2/2012 | | |
| JP | 2014-078478 A | | 5/2014 | | |
| JP | 2015-097240 A | | 5/2015 | | |
| TW | 201348400 A | | 12/2013 | | |
| TW | 201739327 A | | 11/2017 | | |
| WO | 01/064807 A1 | | 9/2001 | | |
| WO | 2013/035164 A1 | | 3/2013 | | |
| WO | 2013/150907 A1 | | 10/2013 | | |
| WO | 2014/021037 A1 | | 2/2014 | | |
| WO | WO 2013-035164 A1 * | | 3/2015 | ............ | C09J 4/06 |
| WO | WO 2013-150907 A1 * | | 12/2015 | ............ | C09J 9/02 |
| WO | WO 2103-150907 A1 * | | 12/2015 | ............ | C08G 59/50 |

* cited by examiner (a)

(b)

ADHESIVE COMPOSITION

CROSS-REFERENCE TO RELATED APPLICATIONS

This application is a U.S. national phase application filed under 35 U.S.C. § 371 of International Application No. PCT/JP2017/031010, filed Aug. 29, 2017, designating the United States, which claims priority from International Application No. PCT/JP2017/004605, filed Feb. 8, 2017, and Japanese Patent Application No. 2016-167655, filed Aug. 30, 2016, which are hereby incorporated herein by reference in their entireties.

TECHNICAL FIELD

The present invention relates to an adhesive composition.

BACKGROUND ART

In recent years, various adhesives have been used in the fields of semiconductors, liquid crystal displays, and the like for fixing electronic components, connecting circuits, and the like. In these applications, higher integration density and higher fineness of electronic components, circuits, and the like are progressed, and adhesives are required to have a higher level of performance.

An adhesive (conductive adhesive) having conductive particles dispersed in the adhesive has been used in, for example, connection between a liquid crystal display and a TCP (Tape Carrier Package), connection between an FPC (Flexible Printed Circuit) and a TCP, or connection between an FPC and a printed wiring board. The conductive adhesive is required to further enhance the conductivity and reliability.

For example, Patent Literature 1 describes a conductive film comprising a conductive layer containing predetermined silver-coated dendritic copper powder particles on a substrate film, and discloses that such a conductive film can provide sufficient conductive properties without including a silver powder.

CITATION LIST

Patent Literature

Patent Literature 1: International Publication No. WO 2014/021037

SUMMARY OF INVENTION

Technical Problem

When electronic component members are connected, the applied pressure may be desirable to be as low as possible. In this case, since electrical connection between the electronic member and the conductive adhesive is difficult, obtaining desired conductivity is difficult. For example, the conductive film as described in Patent Literature 1 has room for improvement in terms of conductivity when electronic members are connected at low pressure (for example, 0.1 to 0.5 MPa). On the other hand, in order to obtain desired conductivity using such a conductive film, it is conceivable to increase the pressure in connecting the electronic members, but in this case, the adhesive component (resin component) may be extruded from an interval between the electronic members and flow out.

In addition, the conductive film as described in Patent Literature 1 is not necessarily sufficient in terms of reliability. The conductive film as described in Patent Literature 1 may not be able to maintain desired conductivity against a change in ambient temperature.

A main object of the present invention is to provide an adhesive composition capable of obtaining excellent conductivity at the time of connection even at low pressure and suppressing outflow of the adhesive component at the time of connection. Another object of the present invention is to provide an adhesive composition having excellent reliability.

Solution to Problem

One aspect of the present invention relates to an adhesive composition used for connecting electronic members, the adhesive composition comprising: a first conductive particle that is a conductive particle having a projection capable of penetrating an oxide film formed on a surface of an electrode of the electronic member; and a second conductive particle that is a conductive particle other than the first conductive particle, the second conductive particle having a nonconductive core body and a conductive layer provided on the core body.

Another aspect of the present invention relates to an adhesive composition comprising: a first conductive particle that is a conductive particle having a pointed projection; and a second conductive particle that is a conductive particle other than the first conductive particles, the second conductive particle having a nonconductive core body and a conductive layer provided on the core body.

The first conductive particle is preferably a conductive particle having an anisotropic shape.

The first conductive particle is preferably a dendritic conductive particle.

The first conductive particle is preferably a flake conductive particle.

The second conductive particle is preferably a substantially spherical conductive particle.

The conductive layer preferably comprises at least one selected from the group consisting of gold, nickel, and palladium.

Advantageous Effects of Invention

The present invention can provide an adhesive composition capable of obtaining excellent conductivity at the time of connection even at low pressure and suppressing outflow of the adhesive component at the time of connection. The present invention can also provide an adhesive composition having excellent reliability.

DESCRIPTION OF EMBODIMENTS

Figure 1:
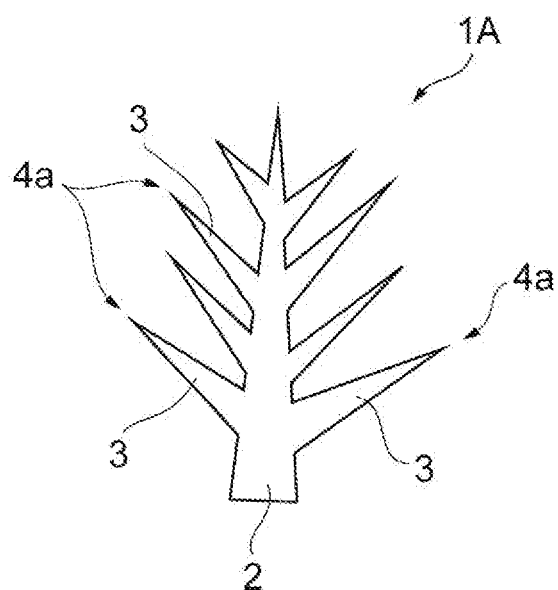
FIG. 1 is a schematic diagram showing one embodiment of a first conductive particle.
Figure 1:
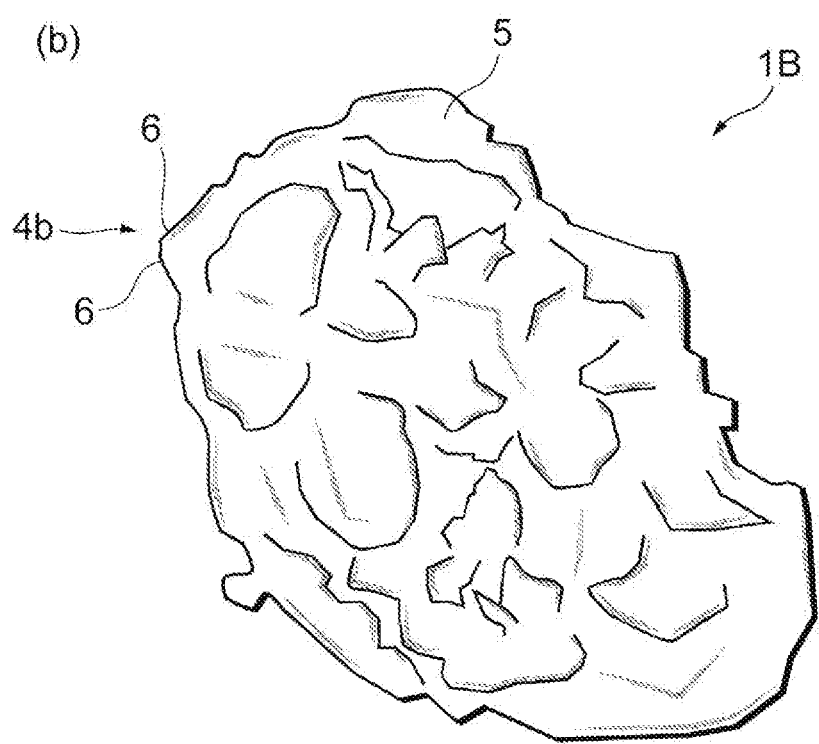

Hereinafter, embodiments of the present invention will be described in detail with reference to the drawings as appropriate.

The adhesive composition according to one embodiment comprises first conductive particles being conductive particles having a projection, and second conductive particles being conductive particles having a nonconductive core body and a conductive layer provided on the core body. The second conductive particles are conductive particles other than the first conductive particles. The adhesive composition usually further contains an adhesive component, and is prepared by dispersing the first conductive particles and the second conductive particles in the adhesive component.

The adhesive component is composed of, for example, a material exhibiting curability by heat or light, and may be an epoxy type adhesive, a radically curable adhesive, a thermoplastic adhesive such as polyurethane and polyvinyl ester, and the like. Since the adhesive component is excellent in heat resistance and moisture resistance after adhesion, the adhesive component may be composed of a crosslinkable material. Of these adhesives, the epoxy type adhesive containing an epoxy resin which is a thermosetting resin as a main component is preferably used from the viewpoint that the epoxy type adhesive can be cured in a short time, has good connection workability, is excellent in adhesiveness, and the like. The radically curable adhesive has properties such as being excellent in curability at a low temperature in a short time as compared with the epoxy type adhesive, and is therefore suitably used according to the application.

The epoxy type adhesive contains, for example, a thermosetting material such as an epoxy resin and a curing agent, and may further contain a thermoplastic resin, a coupling agent, a filler, and the like as necessary.

Examples of the epoxy resin include a bisphenol A type epoxy resin, a bisphenol F type epoxy resin, a bisphenol S type epoxy resin, a phenol novolak type epoxy resin, a cresol novolak type epoxy resin, a bisphenol A novolak type epoxy resin, a bisphenol F novolak type epoxy resin, an alicyclic epoxy resin, a glycidyl ester type epoxy resin, a glycidyl amine type epoxy resin, a hydantoin type epoxy resin, an isocyanurate type epoxy resin, and an aliphatic chain epoxy resin. These epoxy resins may be halogenated or hydrogenated, and may have a structure in which an acryloyl group or a methacryloyl group is added to a side chain. These epoxy resins are used singly or in combinations of two or more.

The curing agent is not particularly limited as long as the curing agent can cure the epoxy resin, and examples thereof include an anionic polymerization catalyst type curing agent, a cationic polymerization catalyst type curing agent, and a polyaddition type curing agent. Of these curing agents, an anionic or cationic polymerization catalyst type curing agent is preferable from the viewpoint of excellent fast curability and no need for chemical equivalent consideration.

Examples of the anionic or cationic polymerization catalyst type curing agent include an imidazole, a hydrazide, a boron trifluoride-amine complex, an onium salt (aromatic sulfonium salt, aromatic diazonium salt, aliphatic sulfonium salt, and the like), an amine imide, a diaminomaleonitrile, a melamine and its derivatives, a polyamine salt, and a dicyandiamide, and modified products thereof can also be used. Examples of the polyaddition type curing agent include a polyamine, a polymercaptan, a polyphenol, and an acid anhydride.

A latent curing agent obtained by microcapsulating these curing agents with polymer substances such as polyurethanes and polyesters, metal thin films of nickel, copper, and the like, inorganic substances such as calcium silicate is preferable since the pot life can be extended. The curing agents are used singly or in combinations of two or more.

The content of the curing agent may be 0.05 to 20 parts by mass with respect to 100 parts by mass of the total amount of the thermosetting material and the thermoplastic resin added as necessary.

A radically curable adhesive contains, for example, a radical polymerizable material and a radical polymerization initiator (also referred to as a curing agent), and may further contain a thermoplastic resin, a coupling agent, a filler, and the like, as necessary.

As the radical polymerizable material, for example, any substance having a functional group which is polymerized by radical can be used without particular limitation. Specific examples of radical polymerizable substances include an acrylate (including corresponding methacrylate, the same applies hereinafter) compound, an acryloxy (including corresponding methacryloxy, the same applies hereinafter) compound, a maleimide compound, a citraconimide resin, and a nadimide resin. These radical polymerizable substances may be in a state of a monomer or a state of an oligomer, or may be in a mixture state of a monomer and an oligomer.

Examples of an acrylate compound include methyl acrylate, ethyl acrylate, isopropyl acrylate, isobutyl acrylate, ethylene glycol diacrylate, diethylene glycol diacrylate, trimethylolpropane triacrylate, tetramethylolmethane tetraacrylate, 2-hydroxy-1,3-diacryloxypropane, 2,2-bis[4-(acryloxymethoxy)phenyl]propane, 2,2-bis[4-(acryloxypolyethoxy)phenyl]propane, dicyclopentenyl acrylate, tricyclodecanyl acrylate, tris(acryloyloxyethyl)isocyanurate, urethane acrylate, and phosphoric acid ester diacrylate.

A radical polymerizable substance such as an acrylate compound may be used together with a polymerization inhibitor such as hydroquinone and methyl ether hydroquinone as necessary. From the viewpoint of improving heat resistance, the radical polymerizable substance such as an acrylate compound preferably has at least one substituent such as a dicyclopentenyl group, a tricyclodecanyl group, and a triazine ring. As the radical polymerizable substance other than the acrylate compound, for example, the compound described in International Publication No. WO 2009/063827 can be suitably used. The radical polymerizable substances may be used singly or in combinations of two or more.

As the radical polymerization initiator, for example, any compound capable of decomposing upon heating or irradiation with light to generate radicals can be used without particular limitation. Specific examples thereof include a peroxide compound an azo compound. These compounds are appropriately selected depending on the target connection temperature, connection time, pot life, and the like.

More specific examples of the radical polymerization initiator include diacyl peroxide, peroxy dicarbonate, peroxy ester, peroxy ketal, dialkyl peroxide, hydroperoxide, and silyl peroxide. Of these initiators, peroxy ester, dialkyl peroxide, hydroperoxide, and silyl peroxide, and the like are preferable, and peroxy ester which can provide high reactivity is more preferable. As these radical polymerization initiators, for example, the compound described in International Publication No. WO 2009/063827 can be suitably used. The radical polymerization initiators are used singly or in combinations of two or more.

The content of the radical polymerization initiator may be 0.1 to 10 parts by mass with respect to 100 parts by mass of the total amount of the radical polymerizable material and the thermoplastic resin added as necessary.

The thermoplastic resin added as necessary to the epoxy type adhesive and the radically curable adhesive makes it easy to provide film properties to the adhesive, for example. Examples of the thermoplastic resin include a phenoxy resin, a polyvinyl formal resin, a polystyrene resin, a polyvinyl butyral resin, a polyester resin, a polyamide resin, a xylene resin, a polyurethane resin, a polyester urethane resin, a phenol resin, and a terpene phenol resin. As the thermoplastic resin, for example, the compound described in International Publication No. WO 2009/063827 can be suitably used. Of these resins, a phenoxy resin is preferable since adhesiveness, compatibility, heat resistance, mechanical strength, and the like are excellent. The thermoplastic resins are used singly or in combinations of two or more.

The content of the thermoplastic resin may be 5 to 80 parts by mass with respect to 100 parts by mass of the total amount of the thermoplastic resin and the thermosetting material when the thermoplastic resin is added to the epoxy type adhesive. The content of the thermoplastic resin may be 5 to 80 parts by mass with respect to 100 parts by mass of the total amount of the thermoplastic resin and the radical polymerizable substance when the thermoplastic resin is added to the radically curable adhesive.

Another example of the adhesive component includes a thermal radical curable adhesive containing a thermoplastic resin, a radical polymerizable material including a radical polymerizable substance in a liquid state at 30° C., and a radical polymerization initiator. The thermal radical curable adhesive has a lower viscosity than the above adhesive component. The content of the radical polymerizable substance in the thermal radical curable adhesive is preferably 20 to 80 parts by mass, more preferably 30 to 80 parts by mass, and further preferably 40 to 80 parts by mass, with respect to 100 parts by mass of the total amount of the thermoplastic resin and the radical polymerizable substance.

The adhesive component may be an epoxy type adhesive containing a thermoplastic resin, a thermosetting material including an epoxy resin in a liquid state at 30° C., and a curing agent. In this case, the content of the epoxy resin in the epoxy type adhesive is preferably 20 to 80 parts by mass, more preferably 40 to 80 parts by mass, and further preferably 30 to 80 parts by mass, with respect to 100 parts by mass of the total amount of the thermoplastic resin and the thermosetting material.

When the adhesive composition is used for connecting an IC chip and a glass substrate, a flexible printed circuit (FPC), or the like, the adhesive composition preferably further comprises a component that exerts an effect of relaxing the internal stress, from the viewpoint of suppressing the warping of the substrate caused by the difference in linear expansion coefficient between the IC chip and the substrate. Specific examples of such components include an acrylic rubber and an elastomer component. Alternatively, the adhesive composition may be a radical curable adhesive as described in International Publication No. WO 98/44067.

In one embodiment, when the adhesive composition is used for connecting electronic members (details will be described later), the first conductive particle has a projection capable of penetrating the oxide film formed on the surface of the electrode in the electronic member (hereinafter it may be referred to as "first conductive particle according to the first embodiment" for convenience). The first conductive particle may have one projection or a plurality of projections.

In another embodiment, the first conductive particle is a conductive particle having a pointed projection (hereinafter it may be referred to as "first conductive particle according to the second embodiment" for convenience). That is, the projection of the first conductive particle according to the second embodiment exhibits the pointed shape of the tip portion, and can be said to be tip-pointed. The tip portion of this projection may be conical, for example. The first conductive particle may have one projection or a plurality of projections.

The first conductive particle according to the first embodiment and the first conductive particle according to the second embodiment may have an anisotropic shape. In the present specification, "a conductive particle having an anisotropic shape" refers to a conductive particle having shape anisotropy, and refers to a conductive particle that is not a conductive particle having a substantially point symmetric (substantially isotropic) shape (for example, a spherical shape).

The aspect ratio of the first conductive particle having an anisotropic shape may be, for example, 0.7 or less, 0.6 or less, or 0.5 or less, and may be 0.1 or more, 0.2 or more, or 0.3 or more. The aspect ratio of the first conductive particle is defined as the ratio (B/A) of the maximum length A of the straight line connecting one end and the other end of the first conductive particle and the maximum length B of a diameter of a circumscribed circle which circumscribes the first conductive particle, the diameter being orthogonal to the straight line.

The first conductive particle according to the first embodiment and the first conductive particle according to the second embodiment may exhibit, for example, a dendritic shape (also referred to as a dendrite shape). FIG. 1(a) is a schematic diagram showing a dendritic conductive particle. As shown in the drawing, a dendritic conductive particle 1A comprises one main shaft 2 and a plurality of branches 3 that two-dimensionally or three-dimensionally branch from the main shaft 2. In the dendritic conductive particle 1A, the plurality of branches 3 each form a pointed projection 4a. When the adhesive composition is used for connecting electronic members, this projection 4a is in a pointed shape, allowing to penetrate the oxide film formed on the surface of the electrode in the electronic member.

The first conductive particle according to the first embodiment and the first conductive particle according to the second embodiment may exhibit, for example, a flake shape. FIG. 1(b) is a schematic diagram showing a flake conductive particle. As shown in the drawing, a flake conductive particle 1B exhibits a plate shape (also referred to as a flat plate shape or a scaly shape) comprising a main surface 5 of a plane surface or a curved surface. The flake conductive particle 1B may have a pointed projection 4b on an outer edge 6 thereof or may have a pointed projection (not shown) on the main surface 5. When the adhesive composition is used for connecting electronic members, this projection 4b is in a pointed shape, allowing to penetrate the oxide film formed on the surface of the electrode in the electronic member.

The first conductive particles may be formed from a metal such as copper or silver, and may be, for example, silver-coated copper particles in which copper particles are coated with silver.

The first conductive particles may be known, and in the case of the dendritic conductive particles, as specific examples, ACBY-2 (Mitsui Mining & Smelting Co., Ltd.), CE-1110 (Fukuda Metal Foil & Powder Co., Ltd.), #FSP (JX Nippon Mining & Metals Corporation), and #51-R (JX Nippon Mining & Metals Corporation) are available. Alternatively, the first conductive particles can be produced by a known method (for example, the method described in the above Patent Literature 1 in the case of the dendritic conductive particles and the method for pulverizing and processing spherical conductive particles with a ball mill or the like in the case of the flake conductive particles).

In addition to the above, the first conductive particles may be needle-shaped conductive particles (for example, needle-shaped conductive particles (available as YTA-1575 (Yokosawa Metal Co., Ltd.) coated with silver on potassium titanate fiber), amorphous conductive particles (for example, amorphous conductive particles (available as CC-13D (Yokosawa Metal Co., Ltd.) coated with copper on graphite), or the like.

The content of the first conductive particles may be 2% by volume or more or 8% by volume or more, and 25% by volume or less or 15% by volume or less, based on the total volume of the solid content in the adhesive composition.

The second conductive particles have a nonconductive core body and a conductive layer provided on the core body. The core body is formed from a nonconductive material such as glass, ceramic, and resin, and is preferably formed from resin. Examples of the resin include an acrylic resin, a styrene resin, a silicone resin, a polybutadiene resin, or copolymers of monomers constituting these resins. The average particle diameter of the core body may be, for example, 2 to 30 µm.

The conductive layer is formed from, for example, gold, silver, copper, nickel, palladium, or an alloy thereof. From the viewpoint of excellent conductivity, the conductive layer preferably comprises at least one selected from gold, nickel, and palladium, more preferably comprises gold or palladium, and further preferably comprises gold. The conductive layer is formed, for example, by plating the above metal on the core body. The thickness of the conductive layer may be, for example, 10 to 400 nm.

The second conductive particles may be, for example, substantially spherical. The average particle diameter of the second conductive particles is preferably 30 µm or less, more preferably 25 µm or less, and further preferably 20 µm or less, from the viewpoint that when the adhesive composition is in a film form, the film can be suitably thinned. The average particle diameter of the second conductive particles may be, for example, 1 µm or more. The average particle diameter of the second conductive particles is measured by a particle size distribution measuring apparatus (Microtrac (product name, Nikkiso Co., Ltd.)) using a laser diffraction-scattering method.

The content of the second conductive particles may be 2% by volume or more or 5% by volume or more, and 20% by volume or less or 10% by volume or less, based on the total volume of the solid content in the adhesive composition.

The volume ratio of the first conductive particles to the second conductive particles (first conductive particles/second conductive particles) in the adhesive composition is preferably 1/1 or more, more preferably 2/1 or more, and further preferably 3/1 or more, and preferably 20/1 or less, more preferably 10/1 or less, and further preferably 6/1 or less.

Figure 2:
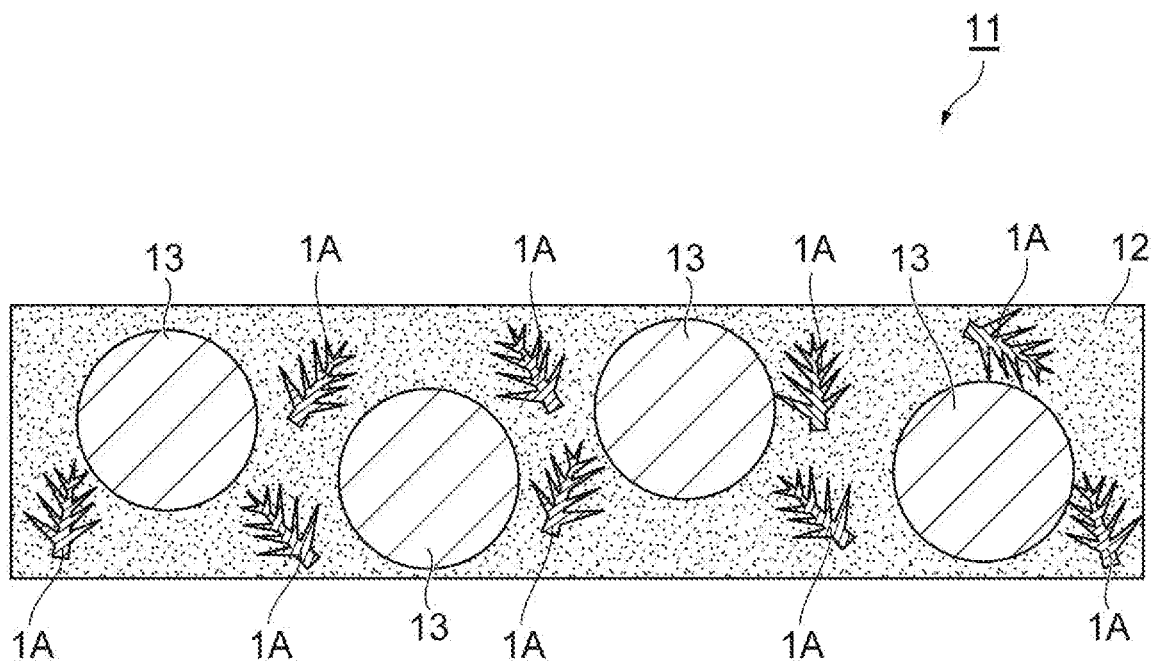
FIG. 2 is a schematic cross-sectional diagram showing one embodiment of a filmy adhesive composition.

The adhesive composition may be, for example, in a film. FIG. 2 is a schematic cross-sectional diagram showing one embodiment of a filmy adhesive composition (adhesive film). As shown in FIG. 2, an adhesive film (filmy adhesive composition) 11 contains an adhesive component 12, and the first conductive particles 1A and second conductive particles 13 dispersed in the adhesive component 12.

The thickness of the adhesive film 11 may be, for example, 30 µm or less, 25 µm or less, or 20 µm or less, and may be 5 µm or more, 7 jam or more, or 10 µm or more.

The adhesive film 11 is obtained by, for example, applying a paste adhesive composition to a resin film such as a PET (polyethylene terephthalate) film and drying the adhesive composition.

The adhesive film may consist of a plurality of the adhesive layers. In this case, the first conductive particles 1A and the second conductive particles 13 may each be included in at least one layer of the plurality of the adhesive layers, and may be included in the same adhesive layer or in different adhesive layers.

The adhesive composition may be, for example, in a paste. The paste adhesive composition is obtained, for example, by heating a mixture including an adhesive component, the first conductive particles, and the second conductive particles or dissolving the mixture in a solvent. As the solvent, for example, a solvent having a boiling point of 50 to 150° C. under atmospheric pressure is used.

The adhesive composition can be cured, for example, by heat treatment. The heating temperature is, for example, 40° C. to 250° C. The heating time is, for example, 0.1 seconds to 10 hours.

The adhesive composition can be adhered to an adherend by a combination of heating and pressurizing. The heating temperature is, for example, 50° C. to 190° C. The pressure is, for example, 0.1 to 30 MPa. These heating and pressurizing are performed, for example, in the range of 0.5 seconds to 120 seconds.

The adhesive composition according to this embodiment can be used as an adhesive for adhering the same types of adherend, and can also be used as an adhesive for adhering different types of adherend (for example, adherends having different thermal expansion coefficients). The adhesive composition is suitably used for connecting electronic members.

Figure 3:
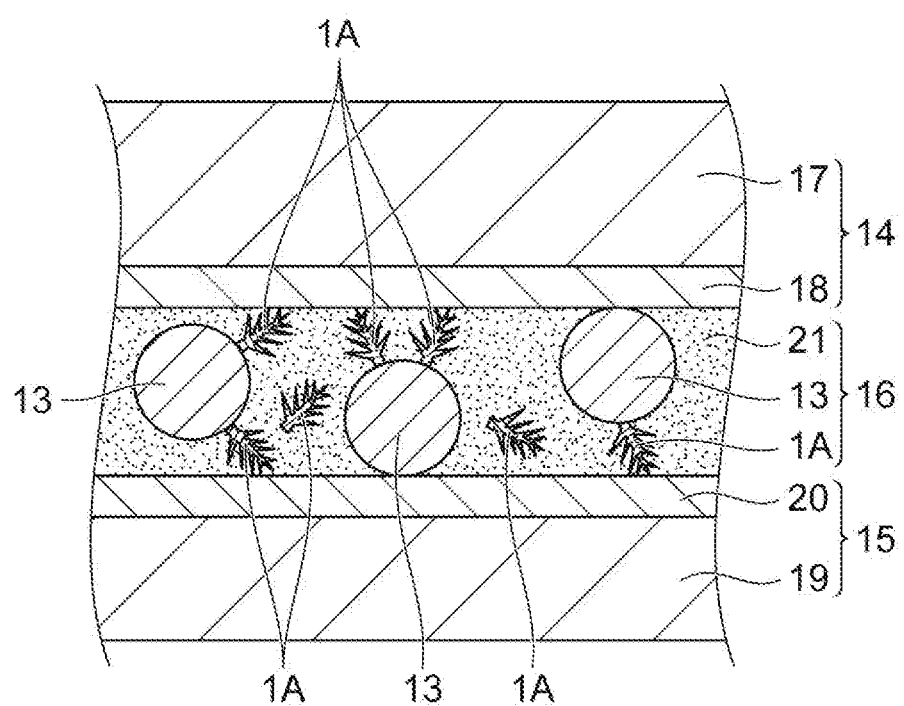
FIG. 3 is a cross-sectional diagram of a main part schematically showing an example of connection between electronic members.

FIG. 3 is a cross-sectional diagram of a main part schematically showing an example of connection between electronic members. As shown in FIG. 3, a first electronic member 14 and a second electronic member 15 are electrically connected via a circuit connecting material 16.

The first electronic member 14 comprises a first substrate 17 and a first electrode 18 formed on the main surface of the first substrate 17. The second electronic member 15 comprises a second substrate 19 and a second electrode 20 formed on the main surface of the second substrate 19.

Each of the first substrate 17 and the second substrate 19 may be a substrate formed from glass, ceramic, polyimide, polycarbonate, polyester, polyethersulfone, or the like. Each of the first electrode 18 and the second electrode 20 may be an electrode formed from gold, silver, copper, tin, aluminum, ruthenium, rhodium, palladium, osmium, iridium, platinum, indium tin oxide (ITO), or the like.

The circuit connecting material 16 includes the first conductive particles 1A, the second conductive particles 13, and a cured product 21 of an adhesive component. That is, the circuit connecting material 16 is obtained by curing the above adhesive composition.

In the adhesive composition according to the present embodiment, it is possible to suitably connect the electronic members 14 and 15, even when the first electrode 18 and the second electrode 20 are formed from a material (for example, copper, aluminum) which easily forms an oxide film on the surface thereof. This is considered to be caused by the fact that the first conductive particles 1A and the second conductive particles 13 are used in combination in the adhesive composition. It is considered that as shown in FIG. 3, while the second conductive particles 13 form a main conduction path for electrically connecting the first electrode 18 and the second electrode 20, the first conductive particles 1A assist the electrical connection between the second conductive particles 13 and each of the electrodes 18 and 20, thereby realizing a suitable connection. The present inventors have considered that more specifically, since the first conductive particles 1A are dendritic conductive particles, even when an oxide film is formed on the surfaces of the electrodes 18 and 20, the pointed projection 4a in the first conductive particles 1A penetrates the oxide film and thereby the first conductive particles 1A can contact with the electrodes 18 and 20, resulting in a suitable connection between the second conductive particles 13 and each of the electrodes 18 and 20.

Therefore, according to the adhesive composition of the present embodiment, even when the electronic members 14 and 15 are connected at low pressure, excellent conductivity can be obtained as compared with, for example, the adhesive composition containing only the first conductive particles 1A as the conductive particles (there is no conductive particles forming a main conduction path for electrically connecting the first electrode 18 and the second electrode 20) and the adhesive composition containing only the second conductive particles 13 as the conductive particles (the case that there is no conductive particles for assisting electrical connection between the second conductive particles 13 and each of the electrodes 18 and 20).

In addition, according to the adhesive composition of the present embodiment, even when the pressure in connecting the electronic members 14 and 15 is increased to obtain the desired conductivity, the second conductive particles 13 forming the main conduction path also play a role of blocking the flowing adhesive component 12, allowing to suppress the outflow of the adhesive component 12 from the interval of the electronic members 14 and 15, as compared with, for example, the adhesive composition containing only the first conductive particles 1A as the conductive particles (the case where conductive particles for blocking the adhesive component 12 do not exist).

In connection between electronic members, the dendritic conductive particles 1A are used as the first conductive particles in the above description, and the other first conductive particles according to the first embodiment such as the flake conductive particles 1B or the first conductive particles according to the second embodiment may be used as the first conductive particles. In this case, as described above, suitably connecting the electronic members 14 and 15 becomes possible, excellent conductivity can be obtained at the time of connection even at low pressure, and the outflow of the adhesive component at the time of connection can be suppressed.

EXAMPLES

Hereinafter, the present invention will be described more specifically based on Examples, but the present invention is not limited to the following Examples.

(Preparation of Solution A1)

50 g of a phenoxy resin (product name: PKHC, weight average molecular weight: 45000, manufactured by Union Carbide Corporation) was dissolved in a mixed solvent of toluene (boiling point: 110.6° C.) and ethyl acetate (boiling point: 77.1° C.) (at a mass ratio of toluene:ethyl acetate=1:1) to obtain a phenoxy resin solution having a solid content of 40% by mass. In this phenoxy resin solution, urethane acrylate (product name: UN7700, manufactured by Negami Chemical Industrial Co., Ltd.) and phosphoric acid ester dimethacrylate (product name: Light Ester P-2M, manufactured by Kyoeisha Chemical Co., Ltd.) as a radical polymerizable substance, and 1,1-bis(t-hexylperoxy)-3,3,5-trimethylcyclohexane (product name: Perhexa TMH, manufactured by NOF Corporation) as a curing agent were blended at a solid mass ratio of phenoxy resin:urethane acrylate:phosphoric acid ester dimethacrylate:curing agent=10:10:3:2 to obtain a solution A1.

The dendritic conductive particles (silver-coated copper particles, product name: ACBY-2, manufactured by Mitsui Mining & Smelting Co., Ltd.) were used as conductive particles B1 (the first conductive particles).

(Preparation of Core Bodies (Resin Particles))

Benzoyl peroxide as a polymerization initiator was added to a mixed solution of divinylbenzene, styrene monomer, and butyl methacrylate, and polymerization reaction was performed by heating at high speed with uniform stirring to obtain a fine particle dispersion solution. This fine particles dispersion solution was filtered and dried under reduced pressure to obtain a block body which was an aggregate of fine particles. This block body was pulverized to prepare core bodies (resin particles) having an average particle diameter of 20 μm and different crosslinking density.

(Preparation of Conductive Particles C1)

A palladium catalyst (product name: MK-2605, manufactured by Muromachi Technos Co., Ltd.) was supported on the surface of the above core body, and the core body activated with an accelerator (product name: MK-370, manufactured by Muromachi Technos Co., Ltd.) was added to a mixed solution of nickel sulfate aqueous solution, sodium hypophosphite aqueous solution, and sodium tartrate aqueous solution heated to 60° C. to perform a pre-electroless plating step. The mixture was stirred for 20 minutes, and it was confirmed that hydrogen bubbling stopped. A mixed solution of nickel sulfate, sodium hypophosphite, sodium citrate, and a plating stabilizer was added and stirred until pH was stabilized, and the post-electroless plating step was performed until hydrogen bubbling stopped. Subsequently, the plating solution was filtered, the filtrate was washed with water, and then dried with a vacuum dryer at 80° C. to prepare a nickel-plated conductive particles C1 (the second conductive particles).

(Preparation of Conductive Particles C2)

The nickel-plated conductive particles C1 was added to a mixed solution of sodium chloroaurate and ion-exchanged water and mixed, and then ammonium thiosulfate, ammonium sulfite, and ammonium hydrogenphosphate were added to prepare a plating solution. Hydroxylamine was added to the obtained plating solution, the pH was then adjusted to 10 with ammonia, the bath temperature was made 65° C., and the reaction was allowed to proceed for about 20 minutes, and thereby conductive particles C2 (the second conductive particles) with the outermost shell plated with gold (the outermost layer was a gold layer) was prepared.

(Preparation of Conductive Particles C3)

The conductive particles C1 plated with nickel was added to a mixed solution containing tetrachloropalladium, ethylenediamine, aminopyridine, sodium hypophosphite, polyethylene glycol, and ion-exchanged water and mixed, the pH was then adjusted to 7.5 with ammonia, the bath temperature was made 60° C., and the reaction was allowed to proceed for about 20 minutes, and thereby conductive particles C3 (the second conductive particles) with the outermost layer plated with palladium (the outermost layer was a palladium layer) was prepared.

Example 1

<Film Formation of Adhesive Composition>

45 parts by volume of the conductive particles B1 and 15 parts by volume of the conductive particles C1 were dispersed in 100 parts by volume of the solution A1 to obtain a mixed solution. The obtained mixed solution was applied on a fluororesin film with a thickness of 80 m and dried with hot air at 70° C. for 10 minutes to remove the solvent to obtain a filmy adhesive composition with a thickness of 25 μm formed on the fluororesin film.

The reliability of using the obtained filmy adhesive composition as a circuit connecting material was evaluated by the following procedure.

<Evaluation of Conductivity at the Time of Low Pressure Connection>

Figure 4:
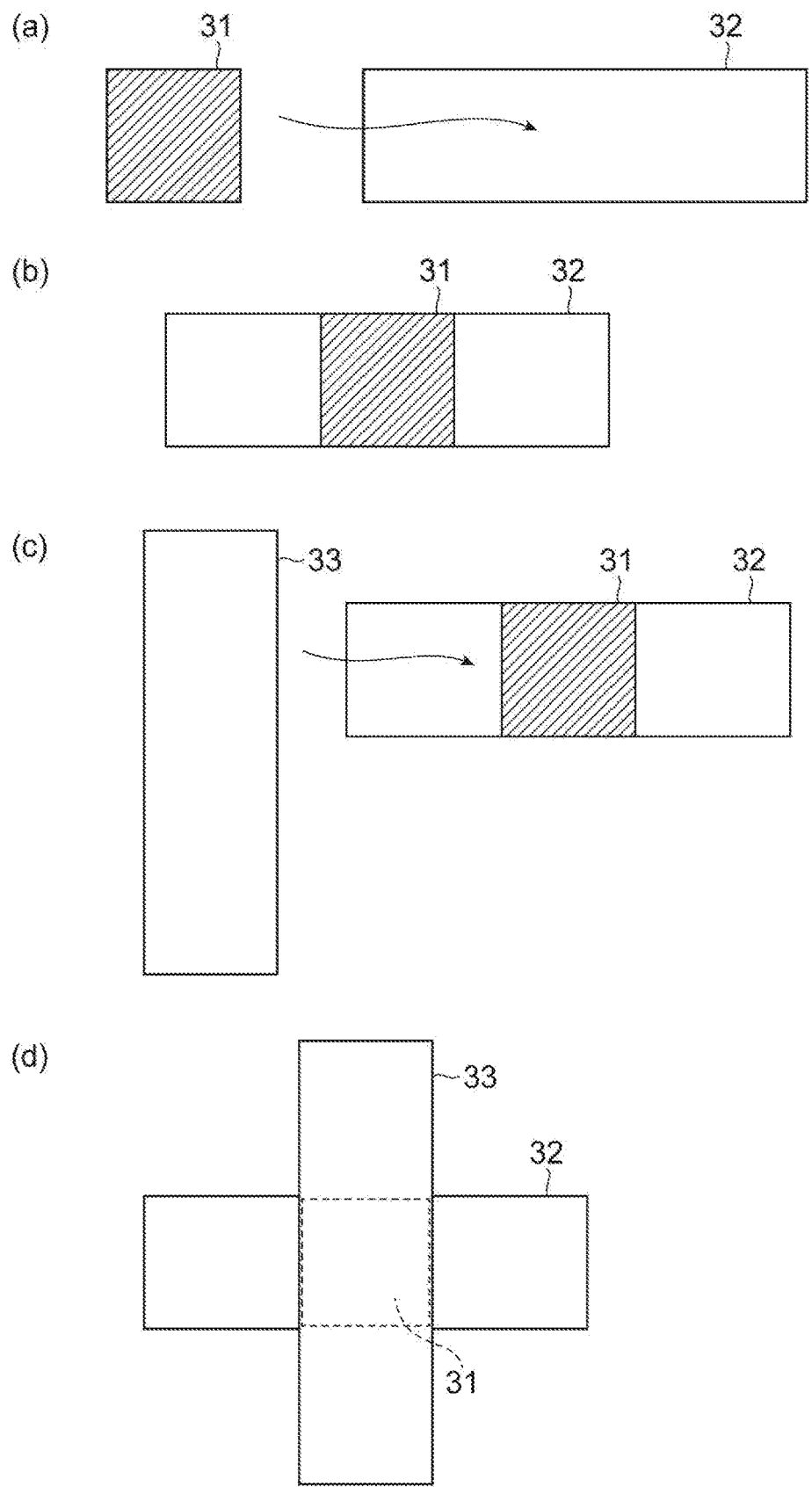
FIG. 4 is a schematic diagram showing a method for preparing a mount set for a reliability test.
Figure 5:
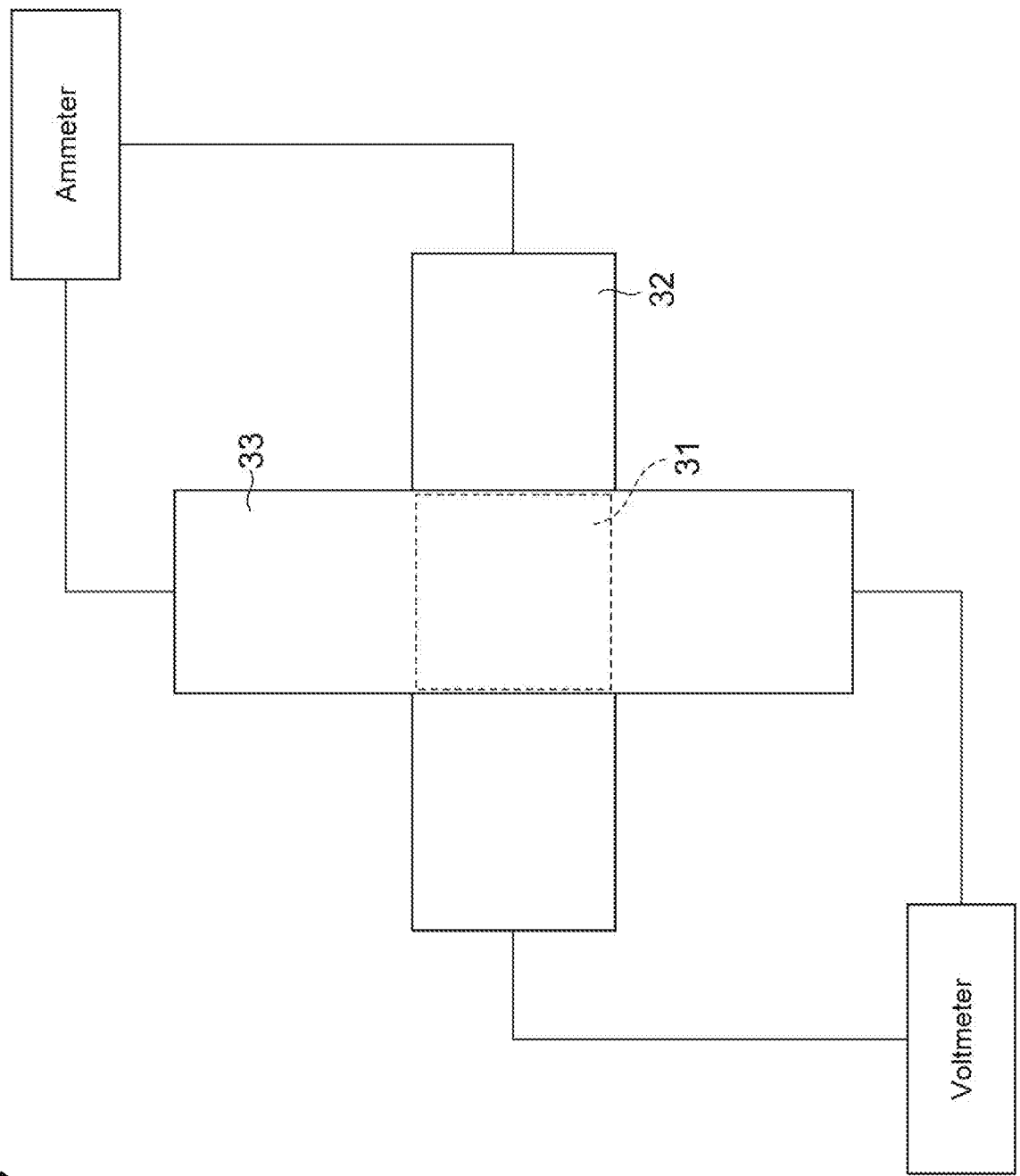
FIG. 5 is a schematic diagram showing a method for measuring connection resistance in a reliability test.

As shown in FIGS. 4(a) and 4(b), an adhesive film 31 obtained by cutting out the obtained filmy adhesive composition into 6 mm×6 mm was placed approximately at the center of a copper foil 32 of 6 mm×50 mm and was attached by heating and pressuring with BD-07 manufactured by Ohashi Engineering Co., Ltd. (50° C., 0.1 MPa, 2 seconds). As shown in FIGS. 4(c) and 4(d), an aluminum foil 33 of 50 mm×6 mm was provided and placed on the laminate of the copper foil 32 and the adhesive film 31 in such a way as to cover the adhesive film 31, heating and pressuring was performed with BD-07 manufactured by Ohashi Engineering Co., Ltd. (150° C., 0.1 MPa, 10 seconds) to obtain a mount set for evaluation of conductivity at the time of low pressure connection. As shown in FIG. 5, an ammeter and a voltmeter were connected to the obtained mount set, and connection resistance (initial) was measured by a four-terminal method. The results are shown in Table 1.

<Evaluation of Suppression of Outflow of Adhesive Component>

In the case of producing a mount set by the same procedure as in the above described <Evaluation of conductivity at the time of low pressure connection>, with respect to the obtained mount set, a pressure P (MPa) necessary for the connection resistance (initial) measured in the same manner as in <Evaluation of conductivity at the time of low pressure connection> to be 0.20Ω (the pressure when the adhesive film 31 was placed on the laminate of the copper foil 32 and the adhesive film 31 and then the laminate was heated and pressurized) was calculated.

The amount of outflow of the adhesive component was then evaluated by the following procedure. The above obtained filmy adhesive composition was cut into a square of 3 mm×3 mm together with the fluororesin film to obtain an adhesive film with the fluororesin film. The adhesive film surface of the adhesive film with the fluororesin film was placed approximately at the center of a corner cover glass manufactured by Matsunami Glass Ind., Ltd. (product No. C018181) in such a way as to be in contact with the cover glass, and was heated and pressurized (60° C., 0.1 MPa, 2 seconds) with BD-07 manufactured by Ohashi Engineering Co., Ltd. and then the fluororesin film was peeled off. Another piece of the same cover glass was placed on the adhesive film, and heated and pressurized (130° C., pressure P (MPa) calculated above, 10 seconds) with BD-07 manufactured by Ohashi Engineering Co., Ltd. The area [A] of the fluororesin film peeled off and the area [B] of the adhesive film after heating and pressurizing were measured as the number of pixels using a scanner and Photoshop (registered trademark), and the amount of outflow was calculated according to the following formula. The results are shown in Table 1.

$$\text{Amount (\%) of outflow} = ([B]/[A]) \times 100$$

<Evaluation of Reliability>

As shown in FIGS. 4(a) and 4(b), the adhesive film 31 obtained by cutting out the obtained filmy adhesive composition into 6 mm×6 mm was placed approximately at the center of the copper foil 32 of 6 mm×50 mm and was attached by heating and pressuring with BD-07 manufactured by Ohashi Engineering Co., Ltd. (50° C., 0.5 MPa, 2 seconds). Subsequently, as shown in FIGS. 4(c) and 4(d), the aluminum foil 33 of 50 mm×6 mm was provided and placed on the laminate of the copper foil 32 and the adhesive film 31 in such a way as to cover the adhesive film 31, heating and pressuring was performed with BD-07 manufactured by Ohashi Engineering Co., Ltd. (150° C., 0.5 MPa, 10 seconds) to obtain a mount set for evaluation of reliability.

As shown in FIG. 5, an ammeter and a voltmeter were connected to the obtained mount set, and connection resistance (initial) was measured by a four-terminal method. Using a TSA-43EL manufactured by Espec Corporation, the mount set was subjected to a heat cycle test by repeating 500 cycles of a heat cycle of holding at −20° C. for 30 minutes, raising the temperature to 100° C. in 10 minutes, holding at 100° C. for 30 minutes, and cooling to −20° C. in 10 minutes, and then the connection resistance (after the heat cycle test) was measured in the same manner as above. When the connection resistance after the heat cycle test was 0.5Ω or less, the reliability was judged to be good. The results are shown in Table 1.

Examples 2 to 4 and Comparative Examples 1 to 4

An adhesive composition was prepared in the same manner as in Example 1 except that the composition of the adhesive composition was changed as shown in Tables 1 and 2, and the conductivity at the time of low pressure connection, suppression of outflow of the adhesive component, and the reliability were evaluated. The results are shown in Tables 1 and 2.

TABLE 1

|  |  | Example 1 | Example 2 | Example 3 | Example 4 |
|---|---|---|---|---|---|
| Composition (parts by volume) | Solution A1 | 100 | 100 | 100 | 100 |
|  | Conductive particle B1 | 45 | 45 | 45 | 90 |
|  | Conductive particle C1 | 15 | — | — | — |
|  | Conductive particle C2 | — | 15 | — | 15 |
|  | Conductive particle C3 | — | — | 15 | — |
| Conductivity at the time of low pressure connection (connection resistance/Ω) |  | 0.37 | 0.22 | 0.31 | 0.26 |
| Outflow suppression of adhesive component | Pressure P (MPa) | 0.22 | 0.15 | 0.26 | 0.17 |
|  | Amount (%) of outflow | ≤0.1 | ≤0.1 | ≤0.1 | ≤0.1 |
| Reliability (connection resistance/Ω) | Initial | 0.11 | 0.05 | 0.16 | 0.07 |
|  | After heat cycle test | 0.42 | 0.11 | 0.12 | 0.13 |

TABLE 2

|  |  | Comp. Example 1 | Comp. Example 2 | Comp. Example 3 | Comp. Example 4 |
|---|---|---|---|---|---|
| Composition (parts by volume) | Solution A1 | 100 | 100 | 100 | 100 |
|  | Conductive particle B1 | — | — | 45 | 90 |
|  | Conductive particle C1 | 15 | 30 | — | — |
|  | Conductive particle C2 | — | — | — | — |
|  | Conductive particle C3 | — | — | — | — |
| Conductivity at the time of low pressure connection (connection resistance/Ω) |  | 5.31 | 7.28 | 8.87 | 9.31 |
| Outflow suppression of adhesive component | Pressure P (MPa) | 0.38 | 0.36 | 0.41 | 0.47 |
|  | Amount (%) of outflow | 10.5 | 13.1 | 6.4 | 7.3 |
| Reliability (connection resistance/Ω) | Initial | 0.13 | 0.11 | 0.12 | 0.14 |
|  | After heat cycle test | 3.42 | 3.12 | 2.91 | 3.02 |

REFERENCE SIGNS LIST

1A: first conductive particle (dendritic conductive particle), 1B: first conductive particle (flake conductive particle), 4a and 4b: projection, 11: adhesive film (filmy adhesive composition), 12: adhesive component, 13: second conductive particle.

The invention claimed is:

1. An adhesive composition used for connecting electronic members, the adhesive composition comprising:
   a first conductive particle that is a conductive particle having a projection capable of penetrating an oxide film formed on a surface of an electrode of the electronic member; and
   a second conductive particle that is a conductive particle other than the first conductive particle, the second conductive particle being a substantially spherical conductive particle and having a nonconductive core body and a conductive layer provided on the core body, wherein the conductive layer comprises at least one selected from the group consisting of gold and palladium.

2. The adhesive composition according to claim 1, wherein the first conductive particle is a conductive particle having an anisotropic shape.

3. The adhesive composition according to claim 1, wherein the first conductive particle is a dendritic conductive particle.

4. The adhesive composition according to claim 1, wherein the first conductive particle is a flake conductive particle.

5. The adhesive composition according to claim 1, wherein the nonconductive core body is formed from a resin.

6. The adhesive composition according to claim 5, wherein a content of the second conductive particles is 2% by volume or more based on the total volume of a solid content in the adhesive composition.

7. The adhesive composition according to claim 6, wherein a content of the second conductive particles is 20% by volume or less based on the total volume of a solid content in the adhesive composition.

8. The adhesive composition according to claim 5, wherein a content of the second conductive particles is 8% by volume or more based on the total volume of a solid content in the adhesive composition.

9. The adhesive composition according to claim 8, wherein a content of the second conductive particles is 20% by volume or less based on the total volume of a solid content in the adhesive composition.

10. The adhesive composition according to claim 8, wherein a content of the second conductive particles is 15% by volume or less based on the total volume of a solid content in the adhesive composition.

11. An adhesive composition comprising:
    a first conductive particle that is a conductive particle having a pointed projection; and
    a second conductive particle that is a conductive particle other than the first conductive particle, the second conductive particle being a substantially spherical conductive particle and having a nonconductive core body and a conductive layer provided on the core body, wherein the conductive layer comprises at least one selected from the group consisting of gold and palladium.

12. The adhesive composition according to claim 11, wherein the first conductive particle is a conductive particle having an anisotropic shape.

13. The adhesive composition according to claim 11, wherein the first conductive particle is a dendritic conductive particle.

14. The adhesive composition according to claim 11, wherein the first conductive particle is a flake conductive particle.

15. The adhesive composition according to claim 11, wherein the nonconductive core body is formed from a resin.

16. The adhesive composition according to claim 15, wherein a content of the second conductive particles is 2% by volume or more based on the total volume of a solid content in the adhesive composition.

17. The adhesive composition according to claim 16, wherein a content of the second conductive particles is 20% by volume or less based on the total volume of a solid content in the adhesive composition.

18. The adhesive composition according to claim 15, wherein a content of the second conductive particles is 8% by volume or more based on the total volume of a solid content in the adhesive composition.

19. The adhesive composition according to claim 18, wherein a content of the second conductive particles is 20% by volume or less based on the total volume of a solid content in the adhesive composition.

20. The adhesive composition according to claim 18, wherein a content of the second conductive particles is 15% by volume or less based on the total volume of a solid content in the adhesive composition.

* * * * *